UNITED STATES PATENT OFFICE.

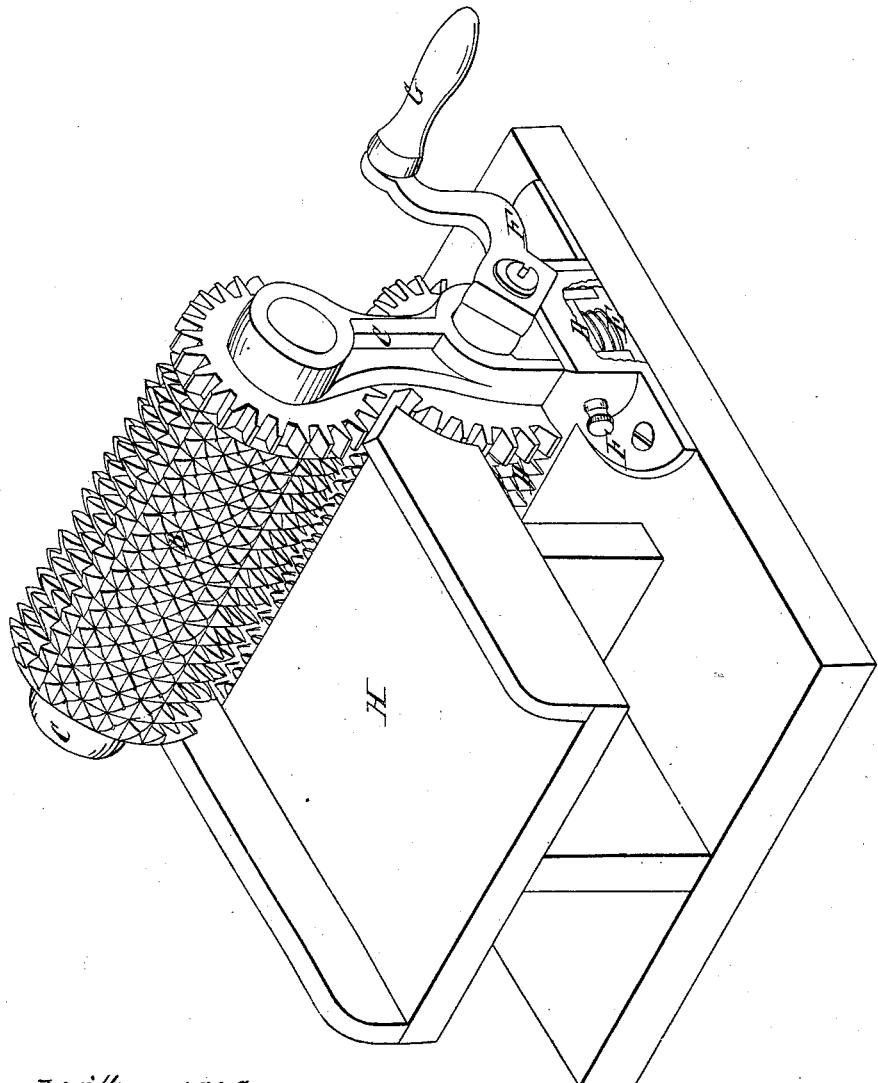
G. Storer,
Meat Tenderer.
Nº 24,831. Patented July 19, 1859.
Witnesses.
Inventor.
George Storer.

GEORGE STORER, OF NEW BRITAIN, CONNECTICUT.

MEAT-MASHER.

Specification of Letters Patent No. 24,831, dated July 19, 1859.

*To all whom it may concern:*

Be it known that I, GEORGE STORER, of New Britain, county of Hartford, and State of Connecticut, have invented certain new and useful Improvements in a New Article of Manufacture—a Meat-Masher; and I do hereby declare that the same is described and represented in the following specification and drawings, and to enable others skilled in the art to make and use my improvement I will proceed to describe its construction and operation, referring to the drawings, in which the same letters indicate like parts in each of the figures.

The nature of this improvement will be fully understood from the following.

In the accompanying drawings is shown an isometrical view of my improvement.

A is the bed-piece by which the machine may be secured to any desired place and to which the other parts are arranged for use.

B, B, are the mashing rollers, upon the surface of which are cast or made, projecting points. I propose to make these rollers in different ways in order to produce a desired and properly diffused projecting pointed surface in lateral and diametrical rows, with an equal number of projecting points in each,—or more in one than in the other as may be desirable—only that they shall be so arranged that the necessity of gearing upon the end of the rollers may be dispensed with and if desirable they may be made whole, and very light,—by casting them hollow—both through the cylinder and through the bearings—and at the same time produce the projecting points diffused over the surface of the cylinders. I also propose to make them in segments and secure them upon a skeleton shaft in a close and compact manner.

C, C, are upright studs or posts secured to the bed A, in which are the bearings for the rollers B, B.

D is a sliding box or bearing fixed loosely in the upright studs underneath and forms a bearing for the lower roller, and is supported firmly by a spring E. Said bearing boxes are steadied or held in place by the screws F.

G is the crank by which the machine is operated.

H is a table on which the meat is placed for feeding into or between the rollers. The meat is then drawn through by turning the crank, and the action of the rollers.

I believe I have thus described my improvement as to enable others skilled to make and use the same.

The advantage to be derived by this improvement over other methods now in use, are practical, as it renders the meat more tender, and more easily and quickly cooked, and is also more agreeable to the taste.

Dealers often maul the meat for the purpose of making it tender, but such action in its effect is mostly superficial and inadequate for the desired object—which is believed to be overcome and attained by this improvement.

What I claim and desire to secure by Letters Patent, is—

The hollow or solid cylinders, with pointed angular teeth, the base of which teeth has nearly in contact, and in combination therewith the device for adjusting the cylinders all constructed substantially as and for the purpose specified.

GEORGE STORER.

Witnesses:
 EDWARD W. BLISS,
 JEREMY W. BLISS.